J. W. TABOR.
FRICTION TRANSMISSION GEAR FOR AUTOVEHICLES.
APPLICATION FILED FEB. 24, 1915.
1,215,076.
Patented Feb. 6, 1917.
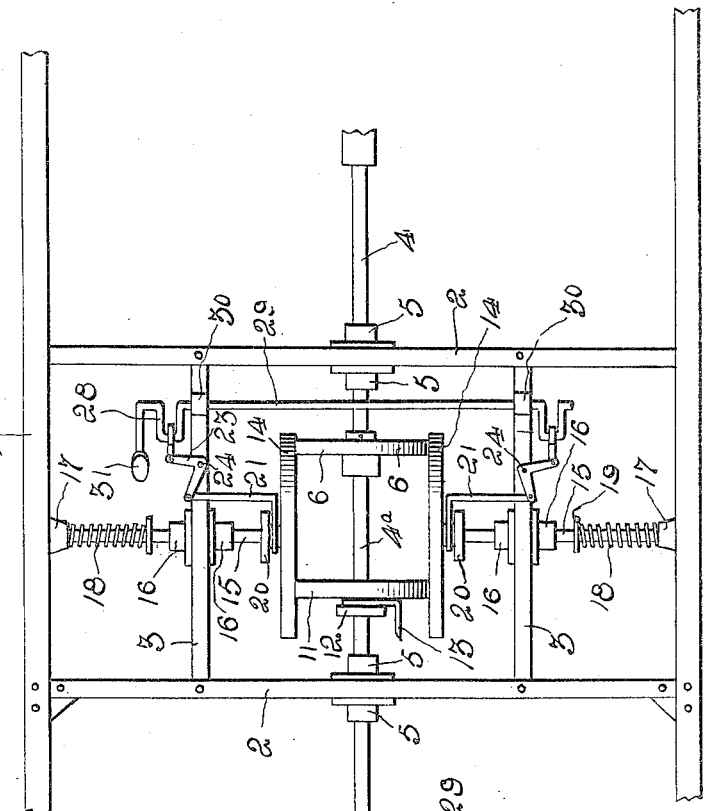
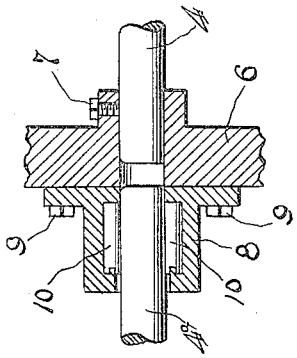
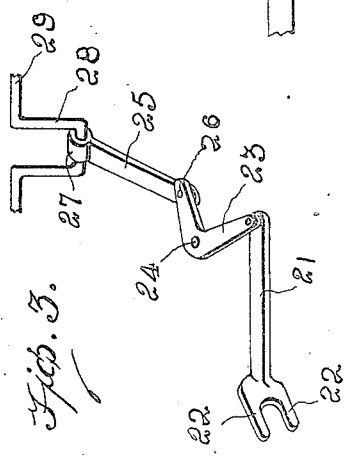
Inventor
J. W. Tabor.
Witnesses
By
Attorney

UNITED STATES PATENT OFFICE.

JACOB W. TABOR, OF NEAR EDDY, OKLAHOMA.

FRICTION TRANSMISSION-GEAR FOR AUTOVEHICLES.

1,215,076. Specification of Letters Patent. Patented Feb. 6, 1917.

Application filed February 24, 1915. Serial No. 10,255.

*To all whom it may concern:*

Be it known that I, JACOB W. TABOR, a citizen of the United States, residing near Eddy, in the county of Grant and State of Oklahoma, have invented certain new and useful Improvements in Friction Transmission-Gears for Autovehicles; and I do hereby declare the following to be a full, clear, and exact description of the invention, such as will enable others skilled in the art to which it appertains to make and use the same.

This invention relates to friction transmission gears, and one of the principal objects of the invention is to provide a friction gear in which the speed may be easily regulated, and in which the transmission may be reversed.

The foregoing and other objects may be attained by means of the construction illustrated in the accompanying drawing, in which—

Figure 1 is a top plan view of a friction gear made in accordance with this invention, Fig. 2 is a fragmentary section of the friction disk fixed to the drive shaft and the roller bearings for the same, and Fig. 3 is a perspective view of one of the compound levers to be operated by a foot lever for relieving the friction disk on the drive shaft, so that one of the disks may be shifted for regulating speed and for reversing.

Referring to the drawing, the numeral 1 designates the side bars of the frame of an auto vehicle, and 2 are the transverse bars connected to the side bars 1 and extending from the bars 2 are the inner frame bars 3. The drive shaft 4 is suitably journaled in the bars 2 and provided with face plates 5 preferably provided with roller bearings. Mounted rigidly on the drive shaft 4 is a friction disk 6 connected to the drive shaft 4 by means of a binding screw 7. The drive shaft is preferably made of two sections, and the section 4ª is mounted in a roller bearing cap 8 secured by bolts 9 to the friction disk 6 and provided with rollers 10.

Mounted to slide on the drive shaft 4ª is a friction disk 11, provided with a grooved collar 12 to be engaged by a lever 13 shown broken away, said lever adapted to shift the friction gear 11 along the shaft 4ª to regulate speed and also to reverse.

Friction disks 14 are each mounted on a separate shaft 15, said shafts being journaled in the bars 3 by suitable face plates and roller bearings, as indicated at 16. The shafts 15 are each provided with a bearing block 17, and a spiral spring 18 encircles each shaft 16 and bears at one end against the block 17, while their opposite ends bear against a collar 19 on each of the shafts 15, said collars 19 being secured rigidly to the shafts.

Grooved collars 20 are connected one to each of the friction gears 14, and a compound lever is connected to each of the grooved collars for moving said gears laterally away from the friction gears 6 and 11, so that the gear 11 may be shifted or slid upon the shaft 4ª to the point desired.

A forked lever, one for each friction disk 14 is connected to the grooved collar 20, the two members 22 saddling the grooved portion of the collar 20, and said levers 21 are each connected to a bell crank lever 23 pivoted at 24 to the bars 3. A link 25 is pivoted at 26 to the bell crank lever 23 at one end while the other end is provided with a ring or bearing 27 pivotally connected to the crank portion 28 of a shaft 29 mounted in bearings 30 on the bars 3. At one end of the shaft 29 is a foot pedal 31 which may be operated by the driver to throw the friction disks 14 out of contact with the disks 6 and 11 when it is desired to shift the disk 11 along the shaft 4ª to regulate the speed by moving out toward the periphery of the disks 14 or by sliding the disk 11 to the opposite side of the shafts 15 to reverse. After the disk 11 has been shifted to the position desired, the foot is removed from the pedal 31 and the springs 18 throw the disk 14 into contact with the disks 6 and 11, as will be understood.

From the foregoing it will be obvious that a friction gearing made in accordance with this invention is exceedingly simple in construction, can be regulated to transmit any speed desired within its limits, and can be readily reversed by placing the foot upon the pedal 13 and adjusting the disk 11 to the position required. It will be understood that the disk 6 is constant.

Various changes in the details of construction may be resorted to without departing from the spirit and scope of the invention as defined in the claim.

What is claimed is:—

In combination, an automobile frame including a pair of transverse bars and a pair of inner frame bars, of a drive shaft journaled in one of said transverse bars, a friction drive disk secured to the shaft, a bearing cap secured to the disk, roller bearings located in said cap, a driven shaft journaled in said cap and in the other transverse bar, a driven friction disk slidably secured to the driven shaft, means for sliding the driven disk toward and from the drive disk, bearings secured to the frame, transverse shafts journaled in the bearings and in the frame bars, friction disks secured to the transverse shafts, coiled springs mounted on the transverse shafts for normally holding the last mentioned disks into engagement with the periphery of the driven and drive disks, grooved collars secured to the transverse shafts, forked levers connected to the collars, bell crank levers pivoted to the inner frame bars and connected to the forked levers and an operating rod connecting the bell crank levers for moving the transverse shaft longitudinally to disengage the disks thereon from the periphery of the driven and drive disks so that the driven disk may be moved on the driven shaft to change the speed thereof.

In testimony whereof I affix my signature in presence of two witnesses.

JACOB W. TABOR.

Witnesses:
 G. W. CARD,
 SAM RIDENOUR.